United States Patent
Niakan et al.

(12)

(10) Patent No.: US 12,497,913 B2
(45) Date of Patent: Dec. 16, 2025

(54) TUNABLE EXHAUST SYSTEM

(71) Applicant: Advanced FLOW Engineering Inc., Corona, CA (US)

(72) Inventors: Shahriar Nick Niakan, Anaheim Hills, CA (US); John Gray, Corona, CA (US); James Erik Provencher, Norco, CA (US)

(73) Assignee: Advanced FLOW Engineering Inc., Corona, CA (US)

( * ) Notice: Subject to any disclaimer, the term of this patent is extended or adjusted under 35 U.S.C. 154(b) by 120 days.

(21) Appl. No.: 17/152,567

(22) Filed: Jan. 19, 2021

(65) Prior Publication Data

US 2021/0222594 A1    Jul. 22, 2021

Related U.S. Application Data

(60) Provisional application No. 62/962,781, filed on Jan. 17, 2020.

(51) Int. Cl.
*F01N 1/08* (2006.01)
*F01N 1/02* (2006.01)
(Continued)

(52) U.S. Cl.
CPC .......... *F01N 1/026* (2013.01); *F01N 2470/04* (2013.01); *F01N 2470/20* (2013.01)

(58) Field of Classification Search
CPC ... F01N 1/026; F01N 1/02; F01N 1/08; F01N 1/083; F01N 1/165; F01N 1/166;
(Continued)

(56) References Cited

U.S. PATENT DOCUMENTS 3,200,902 A * 8/1965 Jones .................. F01N 13/1838
181/243
3,317,001 A * 5/1967 Powers ................... F01N 1/003
181/227
(Continued)

FOREIGN PATENT DOCUMENTS

CN      107667215 B  * 11/2019  ....... F02M 35/10157
DE   202008006353 U1 * 10/2008  ............. F01N 1/085
(Continued)

*Primary Examiner* — Edgardo San Martin
(74) *Attorney, Agent, or Firm* — Rutan & Tucker LLP; Hani Z. Sayed; Ravi Mohan (57) ABSTRACT

A tunable insert assembly for a tunable exhaust system is disclosed for use with an air intake engine of a vehicle. The tunable exhaust system may include an intake tube having first and second ends with a first flange, an exhaust tube having third and fourth ends with a second flange, and a clamp to securely affix the first flange of intake tube to the second flange of exhaust tube. The tunable insert assembly may comprise a register ring, insert, and orifice plate with an opening. The insert may be perpendicularly disposed through the opening of orifice plate, while the register ring may be disposed over and circumferentially surrounds an outermost surface of orifice plate. Lastly, the exhaust system may be configured to produce a desired range of tunable sound pressure levels and a desired tunable sound frequency range based on various predetermined diameters and lengths related to the insert(s).

20 Claims, 5 Drawing Sheets

(51) Int. Cl.
*F01N 13/08* (2010.01)
*F01N 13/18* (2010.01)

(58) Field of Classification Search
CPC ............ F01N 2470/00; F01N 2470/04; F01N 2470/02; F01N 2470/20; F01N 2470/24; F01N 13/08; F01N 13/082; F01N 13/18; F01N 13/1838; F01N 13/20; F02M 35/12; F02M 35/1205; F02M 35/1211; F02M 35/1283; F02M 35/1294
See application file for complete search history.

(56) References Cited

U.S. PATENT DOCUMENTS

| | | | | |
|---|---|---|---|---|
| 3,470,979 | A * | 10/1969 | Everett | F16L 55/04 96/385 |
| 3,480,105 | A * | 11/1969 | Burris | F04B 39/0061 181/255 |
| 3,958,660 | A * | 5/1976 | Boor | F01N 1/08 181/269 |
| 4,064,962 | A * | 12/1977 | Hunt | F01N 1/02 181/272 |
| 4,203,503 | A * | 5/1980 | Franco | F01N 1/089 181/275 |
| 4,209,076 | A * | 6/1980 | Franco | F01N 1/02 181/275 |
| 4,966,253 | A * | 10/1990 | Stephens | F01N 13/1805 181/269 |
| 6,367,580 | B1 * | 4/2002 | Chang | F01N 1/08 181/227 |
| 6,457,551 | B1 * | 10/2002 | Chang | F01N 1/003 181/243 |
| 6,520,285 | B2 * | 2/2003 | Tobias | F01N 1/16 181/227 |
| 6,799,423 | B2 * | 10/2004 | Piekarski | F01N 13/10 60/314 |
| 6,848,252 | B2 * | 2/2005 | Maybeck | F01N 1/085 60/314 |
| 7,021,052 | B1 * | 4/2006 | Hicks | F02B 27/04 60/314 |
| 7,100,736 | B2 * | 9/2006 | Flintham | F01N 3/0335 181/219 |
| 8,123,498 | B2 * | 2/2012 | Deffenbaugh | F04B 39/0061 181/254 |
| 2004/0084247 | A1 * | 5/2004 | Kishida | F01N 13/1844 181/227 |
| 2004/0238273 | A1 * | 12/2004 | Fritskey | F01N 1/12 181/243 |

FOREIGN PATENT DOCUMENTS

| | | | | |
|---|---|---|---|---|
| DE | 202021000724 | U1 * | 5/2021 | |
| GB | 602859 | A * | 6/1948 | |
| GB | 2212771 | A * | 8/1989 | ............ B60K 13/04 |
| JP | H088305 | Y2 * | 3/1996 | |
| KR | 20180024955 | A * | 3/2018 | ................ F25B 1/00 |

* cited by examiner

TUNABLE EXHAUST SYSTEM

PRIORITY CLAIM

This application claims the benefit of and priority to U.S. Provisional Patent Application No. 62/962,781, filed Jan. 17, 2020, which is incorporated in its entirety herein.

FIELD

The embodiments of the present disclosure generally relate to an exhaust system for an internal combustion engine air system. More particularly, the embodiments relate to a tunable exhaust system with a tunable insert assembly which may be used to couple an inlet tube to an outlet tube, and which may be tuned to produce one or more desired sound levels.

BACKGROUND

Current exhaust systems are engineered to emit a distinctive sound that is desired for a particular vehicle. Obtaining a desired sound generally requires careful selection and control over numerous components associated with the exhaust system. Some of these components include selecting from complicated valves, flanges, orifice plates, and so on, and additionally controlling the exhaust diameter, exhaust length, muffler design, resonator design, catalytic converter design, manifold design, flow patterns, hanging configurations, and so on.

As such, many vehicle users may turn to aftermarket exhaust systems for a different sound than that emitted from the originally installed exhaust system. For example, some vehicle users may prefer relatively loud grumbling sounds, which are suggestive of engine power. However, other users of similar vehicles may prefer a quieter sound emitted from the exhaust system. Furthermore, there are certain locations (e.g., near hospitals, schools, libraries, places of worship, and the like), and/or times (e.g., during the hours when people may be sleeping) when loud sound is discouraged or even prohibited.

In an effort to accommodate for these vehicles users and achieve desired engine sounds, several acoustic attenuation devices, such as resonators, mufflers, etc., have been designed to attempt to reduce and, in some cases, eliminate acoustic frequencies for some exhaust systems. Similarly, complicated valves and controls have also been incorporated into several exhaust systems. Furthermore, many vehicles have installed mufflers to control the pressure and sound characteristics from the engine, but these internal characteristics may be controlled by baffles within the mufflers.

However, there may be several shortcomings with these types of designs and devices. For example, the cost and size of the exhaust systems for these vehicles may be substantially increased when multiple resonators are utilized as opposed to a single resonator. Likewise, when mufflers are utilized, their respective baffles are generally configured, placed, and installed into these mufflers during manufacturing of these vehicles. As such, these mufflers and baffles, like many other acoustic attenuation devices, are not movable and their respective tuning characteristics remain fixed. Accordingly, there is still a need for improvement related to the design of vehicle exhaust systems and their acoustic attenuation devices in an effort to accommodate vehicles users and provide those users and their vehicles with their desired engine sounds.

BRIEF DESCRIPTION OF THE DRAWINGS

The above, and other, aspects, features, and advantages of several embodiments of the present disclosure will be more apparent from the following description as presented in conjunction with the following several figures of the drawings. The drawings refer to embodiments of the present disclosure in which.

DETAILED DESCRIPTION OF THE INVENTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references, such as a "first end," may be made. However, the specific numeric reference should not be interpreted as a literal sequential order but rather interpreted that the "first end" is different than a "second end." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, the embodiments of the present disclosure describe one or more tunable exhaust systems for an internal combustion engine air system or the like. More particularly, in most embodiments, the tunable exhaust system may include a tunable insert assembly, one or more inlet tubes, and one or more outlet tubes. According to many embodiments, the tunable insert assembly may be used to couple the inlet tube(s) to the outlet tube(s) and to additionally produce one or more desired sound levels based on one or more parameters of such assembly being tuned.

As described in greater detail below, the tunable exhaust system may include one or more muffled and exhaust exits such as the inlet and outlet tubes, where these tubes may be tunable for producing several desired sounds levels by using a clamp with the tunable insert assembly. For example, the tunable exhaust system may utilize one or more flanges (or the like) with the clamp to couple the inlet/outlet tubes and tunable insert assembly together. Whereas, in some embodiments, the inlet/outlet tubes and tunable insert assembly may be coupled together with one or more flanged connections that are secured by one or more nuts and bolts. Furthermore, the tunable insert assembly may include an orifice plate and a tunable insert such as a tunable baffle insert or the like, where the tunable insert may be coupled directly to the orifice plate (e.g., as shown with the coupled insert 210 and orifice plate 220 of the tunable insert assembly 101 depicted in FIG. 3A).

As noted above, the tunable insert assembly—in conjunction with the exhaust system—may be tuned to produce various sound levels based on one or more tunable parameters. For example, these tunable parameters may include, but are not limited to, altering one or more diameters of the tunable insert assembly ("D"), modifying one or more lengths of the insert ("L"), and utilizing one or more different insert designs and/or materials (e.g., a solid insert, a perforated insert, a flared insert, a crimped insert, and so on). As such, in some embodiments, the tunable insert assembly may be tuned by altering a first diameter and an overall length of the insert to thereby produce a desired sound pressure level (e.g., as shown respectively with "$D_1$" and "$L_2$" of the insert 210 depicted in FIG. 4A). In other embodiments, the tunable insert assembly may be tuned by modifying a particular length of a first portion of the insert to thereby produce a desired sound frequency tuning (e.g., as shown with "$L_1$" of the insert 210 depicted in FIG. 4A). It should be understood that any number of tunable parameters and any types (or variations) of tunable parameters may be utilized by the tunable exhaust system described herein, without limitation.

Additionally, the embodiments described herein may provide several substantial improvements to the existing exhaust devices and systems by: (i) utilizing inserts with concentric registers that allow ease of installation using simple hand tools; (ii) maintaining concentricity designs for all of the tunable exhaust systems and assemblies by facilitating various tunable lengths for the inserts and for the respective registers on those inserts; and (iii) providing considerable ease of tuning any exhaust systems and/or assemblies to thereby produce various desired sound pressure levels and sound frequency tuning Accordingly, these disclosed embodiments may solve the limitations of the existing exhaust systems by providing the disclosed insert assemblies that may be tuned to produce various sound levels and frequency tuning-without the need of complicated valves, controls, tools, installment kits, redesigned plates and flanges with no tuning, and so on.

Prior to discussing the embodiments depicted below, it should be understood that the particular embodiments disclosed herein do not limit the scope of the concepts provided herein. Also, it should also be understood that a particular embodiment disclosed herein can have features that can be readily separated from the particular embodiment and optionally combined with or substituted for features of any of a number of other embodiments disclosed herein.

In regard to the terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. Labels such as "left," "right," "top," "bottom," "front," "back," and the like are used for convenience and are not intended to imply, for example, any particular fixed location, orientation, or direction. Instead, such labels are used to reflect, for example, relative location, orientation, or direction. Singular forms of "a," "an," and "the" include plural references unless the context clearly dictates otherwise.

For example, with respect to an "intake portion" or "intake end portion" of a tunable exhaust assembly or a component thereof (e.g., an intake tube), such a portion is intended to be near an intake of the tunable exhaust assembly or the component in accordance with use of the tunable exhaust assembly or the component as described herein. As such, in this example, an "intake tube" of the tunable exhaust assembly or the component thereof includes a tube near the intake of the tunable exhaust assembly or the component thereof. The intake tube, the intake portion, or the intake end portion of the tunable exhaust assembly or the component thereof may include the intake tube of the tunable exhaust assembly or the component, respectively; however, the intake tube, the intake portion, or the intake end portion of the tunable exhaust assembly or the component thereof need not include the intake portion of the tunable exhaust assembly or the component, respectively. That is, unless context suggests otherwise, the intake tube, the intake portion, or the intake end portion of the tunable exhaust assembly or the component thereof is not a terminal portion of the tunable exhaust assembly or the component.

Similarly, with respect to an "outlet portion" or "outlet end portion" of a tunable exhaust assembly or a component thereof (e.g., an outlet tube), such a portion is intended to be near an outlet of the tunable exhaust assembly or the component in accordance with use of the tunable exhaust assembly or the component as described herein. As such, in this example, an "outlet tube" of the tunable exhaust assembly or the component thereof includes a tube near the outlet of the tunable exhaust assembly or the component thereof. The outlet tube, the outlet portion, or the outlet end portion of the tunable exhaust assembly or the component thereof may include the outlet tube of the tunable exhaust assembly or the component, respectively; however, the outlet tube, the outlet portion, or the outlet end portion of the tunable exhaust assembly or the component thereof need not include the outlet portion of the tunable exhaust assembly or the component, respectively. That is, unless context suggests otherwise, the outlet tube, the outlet portion, or the outlet end portion of the tunable exhaust assembly or the component thereof is not a terminal portion of the tunable exhaust assembly or the component.

Accordingly, the embodiments described below may include a tunable exhaust system for an internal combustion engine of a vehicle or the like. Furthermore, in most embodiments, the tunable exhaust system comprises one or more tunable insert assemblies configured to produce a range of tunable sound pressure levels and sound frequencies based on a variety of predetermined parameters for the tunable insert assemblies, such as alternating one or more diameters, lengths, shapes, and so on. As shown in the following figures, the embodiments may depict various related tunable exhaust systems with various related tunable insert assemblies, where the tunable exhaust systems and insert assemblies may incorporate one or more intake and exhaust tubes, one or more inserts, one or more orifice plates, one or more register rings, and one or more securing elements to securely affix the intake tubes to the exhaust tubes and also house (in place) the register rings, orifice plates, and inserts.

It should be understood that any of the tunable exhaust systems and insert assemblies described herein may be configured for any types of engines for any types of vehicles, without limitations. However, it should also be understood that any tunable exhaust systems and insert assemblies described herein may be configured for any other non-vehicular engines and/or any other non-vehicular air intake systems, without limitations. In addition, while the tunable exhaust systems described herein may depict various tunable insert assemblies with various different configurations and components that are being used in conjunction with various other vehicular engine and exhaust systems/components (e.g., the intake and exhaust tubes depicted in the figures below), the tunable exhaust systems and the tunable insert assemblies described herein may be used separately and not in conjunction with each other, and/or may be used together and not in conjunction with any other discussed vehicular engine and exhaust systems/components, based on the desired applications and/or designs, without limitations.

Figure 1:
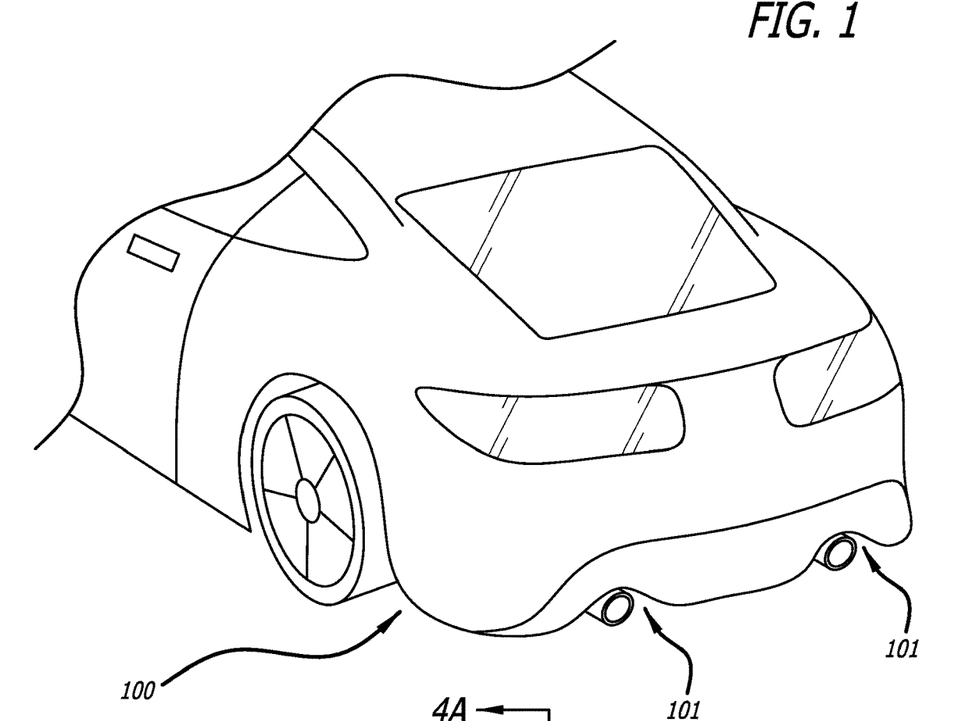
FIG. 1 provides a perspective view illustration of a tunable exhaust system with one or more tunable insert assemblies, in accordance with an embodiment of the present disclosure.

Referring now to FIG. 1, a perspective view illustration of a tunable exhaust system 100 with one or more tunable insert assemblies 101 is shown, in accordance with embodiments of the disclosure. In several embodiments, the tunable exhaust system 100 and the tunable insert assemblies 101 may be configured for an internal combustion engine (not shown) of a vehicle, as shown with the illustrated portion of the vehicle depicted in FIG. 1. For example, the vehicle may comprise any type of vehicle such as the vehicle shown in FIG. 1, which may be configured for the tunable exhaust system 100 and the tunable insert assemblies 101 to provide a tunable exhaust sound for the vehicle with added levels of tuning control for particular sound pressure levels and sound frequencies.

As described in further detail below, the tunable exhaust system 100 may include any number of tunable insert assemblies 101 that may be installed with the exhaust system of the vehicle depicted in FIG. 1. In most embodiments, any of the tunable insert assemblies 101 may include an insert, an orifice plate, and a register ring (e.g., as shown below with the tunable insert assemblies depicted in FIGS. 2-5). Furthermore, any combination of inserts, orifice plates, and register rings of the tunable insert assemblies 101 may be particularly configured to produce a desired range of tunable sound pressure levels and a desired sound frequency range based on, for example, one or more different lengths selected for the insert, one or more different lengths selected for a portion of the insert (e.g., the first portion 260 of the insert 210 depicted in FIG. 3A), one or more different shapes and/or configurations selected for the insert (e.g., as shown with the various shapes of the inserts 210 and 311-313 depicted in FIGS. 3A-D), and so on.

Accordingly, the embodiments of the tunable exhaust system 100 and the tunable insert assemblies 101 may be configured to couple any number and types of muffled and exhaust exits of the vehicle that are capable of being tuned to produce a desired sound level for that vehicle. For example, the muffled and exhaust exits may include any combination of intake/inlet tubes, exhaust/outlet tubes, and any other similar tubes that may be assembled together and in conjunction with the tunable exhaust system 100 and the tunable insert assemblies 101. Also, in addition to the tunable insert assemblies 101, the tunable exhaust system 100 may further comprise one or more first tubes for delivering exhaust gases from an exhaust manifold system of the vehicle (e.g., the intake/inlet tubes 410 depicted in FIGS. 4A-C) to the second tubes for transferring the exhaust gases from the exhaust manifold system and first tubes to the mufflers and exhaust pipes of the vehicle (e.g., the exhaust/outlet tubes 420 depicted in FIGS. 4A-C).

Although one tunable exhaust system 100 having two tunable insert assemblies 101 are depicted in FIG. 1, it should be understood that any number of tunable exhaust systems 100 and tunable insert assemblies 101 may be utilized by the vehicle, without limitations. Furthermore, even if the tunable exhaust system 100 and the tunable insert assemblies 101 may be configured and installed together as a single system, it should be understood that any of the tunable exhaust systems 100 and/or the tunable insert assemblies 101 may be configured and installed in separate vehicle systems, without limitations. Also, in addition to providing improved sound tunability for the vehicle in FIG. 1, it should be recognized that, since the tunable exhaust systems 100 and the tunable insert assemblies 101 do not require any additional changes to any of the internal components of the vehicle's exhaust system, these tunable exhaust systems and insert assemblies 100-101 described herein provide further improvements to the existing exhaust systems by tuning and controlling various desired sound levels-without adversely affecting the performance of such vehicles.

Lastly, it is to be understood that the placement and shapes of the various components of the tunable exhaust system 100 having the tunable insert assemblies 101 may be adapted for applications other than those illustrated in the following figures. As such, it should also be understood that the embodiments illustrated in the accompanying figures and described in relation thereto are not intended as being limiting, as certain variations such as the sizes and lengths of the intake and exhaust tubes, the placement of the tunable insert assemblies 101, and the lengths, diameters, and shapes of the inserts and orifice plates may be varied, without deviating from the disclosed embodiments as depicted below in FIGS. 2-5.

Figure 2:
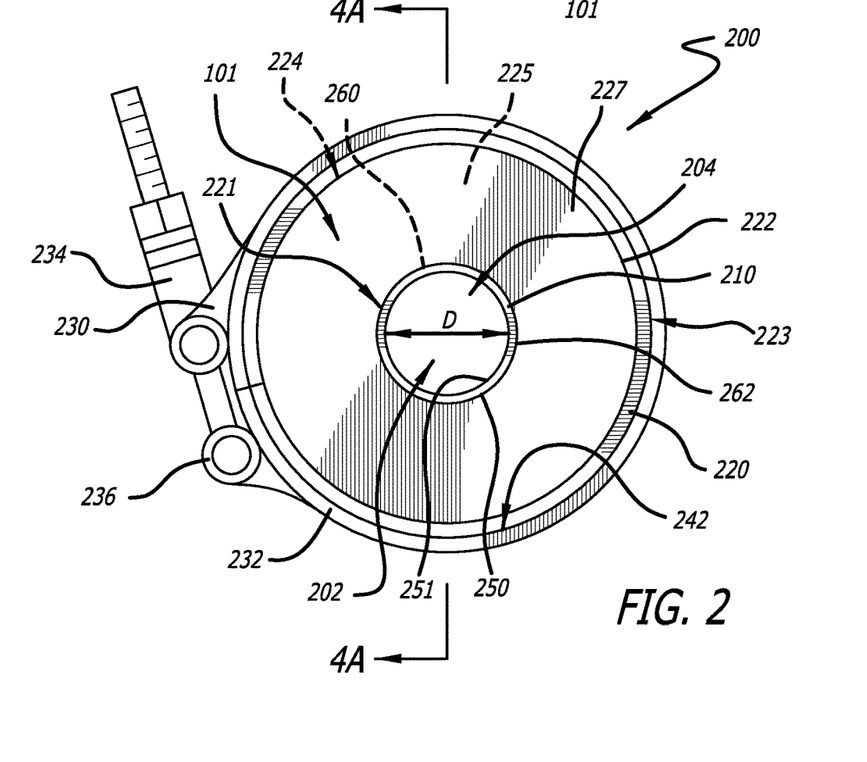
FIG. 2 provides a plan view illustration of an assembly with a clamp that is coupled to a tunable insert assembly, in accordance with an embodiment of the present disclosure.
Figure 4A:
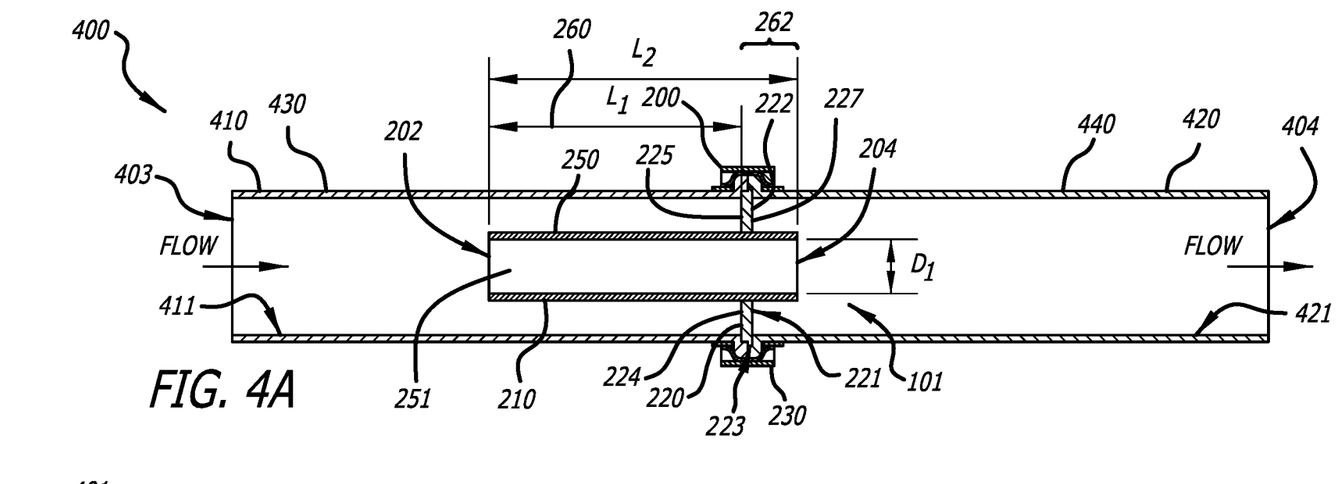
FIG. 4A provides a cross-sectional view illustration of a tunable exhaust system assembly with a tunable insert assembly for coupling an inlet tube to an outlet tube and for tuning one or more first parameters to produce one or more desired sound levels, in accordance with an embodiment of the present disclosure.

Referring now to FIG. 2, a plan view illustration of an assembly 200 with a clamp 230 and a tunable insert assembly 101 is shown, in accordance with an embodiment of the disclosure. As discussed below, the illustration of the assembly 200 in FIG. 2 may be illustrated as a cross-sectional view in FIG. 4, as viewed along the axis "4A" depicted in FIG. 2. It should be understood that the tunable insert assembly 101 depicted in FIG. 2 may be substantially similar to one of the tunable insert assemblies 101 depicted in FIG. 1. Likewise, the assembly 200 with the tunable insert assembly 101 depicted in FIG. 2 may be similar to any of the tunable insert assemblies 101 depicted in FIG. 1, with the exception that the clamp 230 depicted in FIG. 2 is disposed over and securely affixed to the tunable insert assembly 101. That is, the assembly 200 may be configured to secure the tunable insert assembly 101 in place using the clamp 230.

According to most embodiments, the tunable insert assembly 101 may include an insert 210, an orifice plate 220, and a register ring 223. The insert 210 may include a first open end 202, a second open end 204, an outer surface 250, an inner surface 251, a first portion 260, and a second portion 262. As shown in FIG. 2, the insert 210 may be configured with a predetermined diameter "D" which may be defined as the inner diameter of the insert 210. Furthermore, the orifice plate 220 may include an opening 221, a first end 224, a second end 222, an outer surface 227 of the second end 222, and an outer surface 225 of the first end 224.

Figures 3A, 3B:
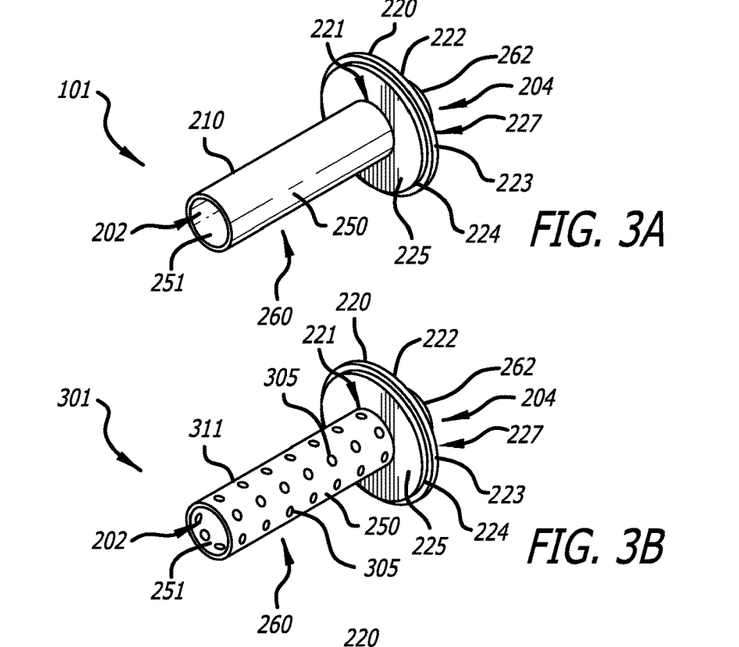
FIG. 3A provides a perspective view illustration of a tunable insert assembly with a tunable insert and an orifice plate, in accordance with an embodiment of the present disclosure.
FIG. 3B provides a perspective view illustration of a tunable perforated insert assembly with a tunable perforated insert and an orifice plate, in accordance with an embodiment of the present disclosure.

The tunable insert assembly 101 may be configured to have the insert 210 disposed perpendicularly through the opening 221 of the orifice plate 220, as better shown with the perspective side-view of the tunable insert assembly 101 depicted in FIG. 3A. That is, it should be understood that any configurations and/or components associated with the tunable insert assembly 101 depicted in FIG. 2 may be referenced (or supplemented) in conjunction with the perspective view of the tunable insert assembly 101 depicted in FIG. 3A. For example, as depicted in FIGS. 2 and 3A, the first portion 260 of the insert 210 may extend laterally from the first open end 202 to the perpendicular intersection of the first end 224 of the orifice plate 220 (i.e., to the outer surface 225 of the first end 224), while the second portion 262 of the insert 210 may extend laterally from the second open end 204 to the perpendicular intersection of the second end 222 of the orifice plate 220 (i.e., to the outer surface 227 of the first end 224).

In several embodiments, the insert 210 may comprise a baffle insert (or a baffle shaped insert). For example, the baffle insert (or baffle insert tube) may comprise a cylindrically shaped hollow tube which laterally extends from the first open end 202 to the second open end 204. In most embodiments, the insert 210 may be any type of solid insert tube such as a metallic insert tube generally used with exhaust systems or the like. Whereas, in some other embodiments, the insert 210 may include, but is not limited to, a perforated tube, a flared tube, a crimped tube, and/or any other similarly shaped tubes (e.g., as shown below with the respective inserts 311-313 depicted in FIGS. 3B-D).

Furthermore, the orifice plate 220 may have an outer (or outermost) surface and an inner surface. For example, the outer surface of the orifice plate 220 may extend along the peripheral outer circumference of the orifice plate 220, while the inner surface of the orifice plate 220 may extend along the circumference of the opening 221. As such, as shown in FIG. 2, the inner surface of the opening 221 of the orifice plate 220 may be disposed over or on a portion of the outer surface 250 of the insert 210. In most embodiments, the opening 221 may have a diameter that is substantially equal to the outermost diameter of the insert 210. However, in alternate embodiments, the opening 221 may be configured with a diameter that is different from (or greater/less than) the outermost diameter of the insert 210. It should be understood that, in some embodiments, any number of other openings (or holes) with any desired sizes—in addition to the opening 221—may be configured for the orifice plate 220, without limitation.

In several embodiments, the orifice plate 220 may comprise a concentric orifice plate. For example, the concentric orifice plate may comprise a disk-shaped orifice plate with a concentric opening formed in the disk-shaped orifice plate, where the concentric opening may be configured as the opening 221. As such, in this example, the outer surface of the orifice plate 220 may be concentrically aligned with the inner surface of the opening 221 of the orifice plate 220. Alternatively, in some embodiments, the orifice plate 220 may be any other type of orifice plate including, but not limited to, an eccentric orifice plate, a segmental orifice plate, and/or any other similarly shaped plate.

According to most embodiments, the register ring 223 may comprise a concentric register ring (or the like). For example, the concentric ring may comprise a solid band-shaped (or ring-shaped) portion that is disposed over and circumferentially surrounds a portion of the outer surface of the orifice plate 220, where the concentric register ring may, in some embodiments, protrude and extend outwards from the outer surface of the orifice plate 220. For example, according to several embodiments, the orifice plate 220 may be clamped between two register rings 223 (or two or more register rings 223) on the intake and exhaust tubes 410 and 420 depicted in FIG. 4A (or clamped between two register rings 223 in between the intake and exhaust tubes 410 and 420 depicted in FIG. 4A), where such clamping between the orifice plate 220 and the register rings 223 assures that the orifice plate 220 is held securely to avoid any rattling or any such disturbances. Meanwhile, other embodiments for retaining the orifice plate 220 into the one or more register rings 223 may include a threading interface, a cammed/locking interface, and/or the like. Moreover, as shown in FIG. 2, the orifice plate 220 and insert 210 may be disposed in or extending through the inner diameter of the register ring 223. Also, as noted above, it should be understood that the register ring 223 has been configured to enhance the concentricity and thereby provide ease of installation (or a simplified installation) for the tunable insert assembly 101 for any of the tunable exhaust systems described herein, without limitation.

Lastly, in several embodiments, the clamp 230 may comprise a band 232, one or more nuts 234, one or more bolts 236, and an inner surface 242. The clamp 230 may comprise a securing element configured to securely affix an intake tube to an exhaust tube, while also securing the register ring 223 and the orifice plate 220 in place. For example, the clamp 230 may be configured to dispose the inner surface 242 of the band 232 over the outer surfaces of the register ring 223 and the orifice plate 220, and to thereby tighten the respective nuts 234 and bolts 236 to secure the tunable insert assembly 101 in place. In most embodiments, the clamp 230 may comprise a V-band shaped clamp or the like. Whereas, in other embodiments, any other type of securing elements such as a flanged connection (or interface) may be configured—without using the clamp 230—to secure the tunable insert assembly 101, without limitations.

Referring now to FIGS. 3A-D, a series of perspective view illustrations of tunable insert assemblies 101 and 301-303 are shown, in accordance with embodiments of the disclosure. In most embodiments, the tunable insert assembly 101 depicted above in FIGS. 1-2 may be similar to the tunable insert assemblies 101 and 301-303 respectively depicted in FIGS. 3A-D. For example, the tunable insert assemblies 301-303 depicted in FIGS. 3B-D may be similar to the tunable insert assembly 101 depicted in FIGS. 1-2, with the exception that the insert 311 depicted in FIG. 3B may be comprised of a perforated insert, that the insert 312 depicted in FIG. 3C may be comprised of a flared insert, and that the insert 313 depicted in FIG. 3C may be comprised of a crimped insert. That is, the illustrated embodiments depicted in FIGS. 3A-D may provide various insert tubes having various sizes and/or shapes, which may be configured for any of the tunable insert assemblies and any of the tunable exhaust systems depicted and described herein, without limitations.

Figure 3C:
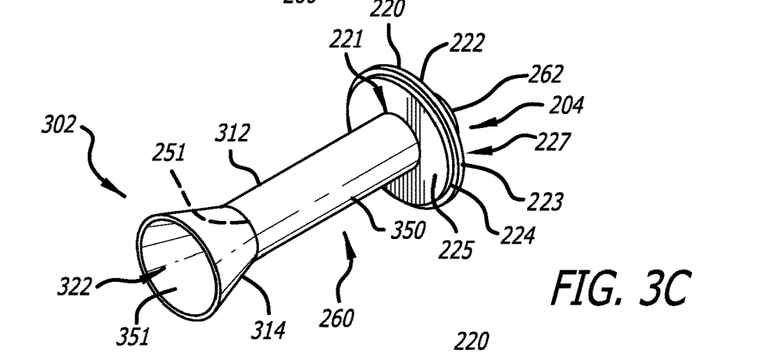
FIG. 3C provides a perspective view illustration of a tunable flared insert assembly with a tunable flared insert and an orifice plate, in accordance with an embodiment of the present disclosure.
Figure 3D:
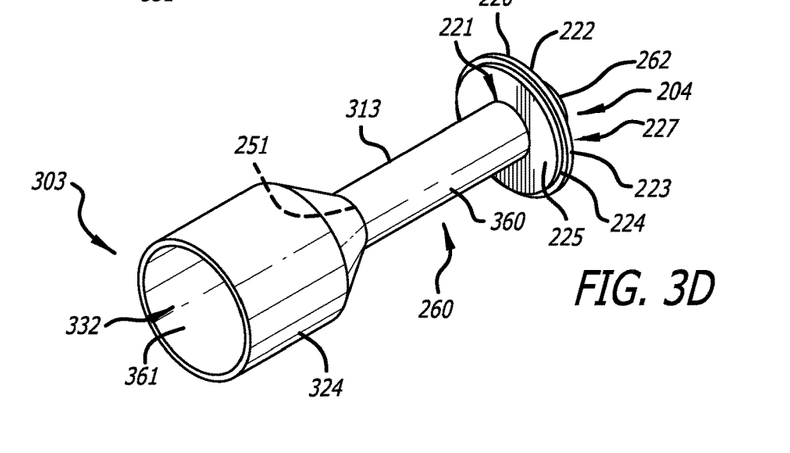
FIG. 3D provides a perspective view illustration of a tunable crimped insert assembly with a tunable crimped insert and an orifice plate, in accordance with an embodiment of the present disclosure.

As shown in FIG. 3A, the tunable insert assembly 101 may be substantially similar to the tunable insert assembly 101 depicted above in FIGS. 1-2. In FIG. 3B, the tunable insert assembly 301 may comprise a tunable perforated insert assembly having a plurality of perforated openings 305 disposed through a perforated insert 311. Likewise, in FIG. 3C, the tunable insert assembly 302 may comprise a tunable flared insert assembly having a tunable flared insert 312 and a flared portion 314, which may be disposed around a first open end 322 of the tunable flared insert 312. Furthermore, as shown in FIG. 3C, the tunable flared insert 312 may have an outer surface 350 and an inner surface 351 of the flared portion 314. Lastly, in FIG. 3D, the tunable insert assembly 303 may comprise a tunable crimped insert assembly having a tunable crimped insert 313 and a crimped portion 324, which may be disposed around a first open end 332 of the tunable crimped insert 313. Furthermore, as shown in FIG. 3D, the tunable crimped insert 313 may have an outer surface 360 and an inner surface 361 of the crimped portion 324. Although only four tunable insert assemblies with four different insert types, shapes, and sizes are shown in FIGS. 3A-D, it should be understood that any number of inserts and any types, shapes, and sizes of inserts may be configured for any tunable insert assemblies, without limitations.

Figure 4B:
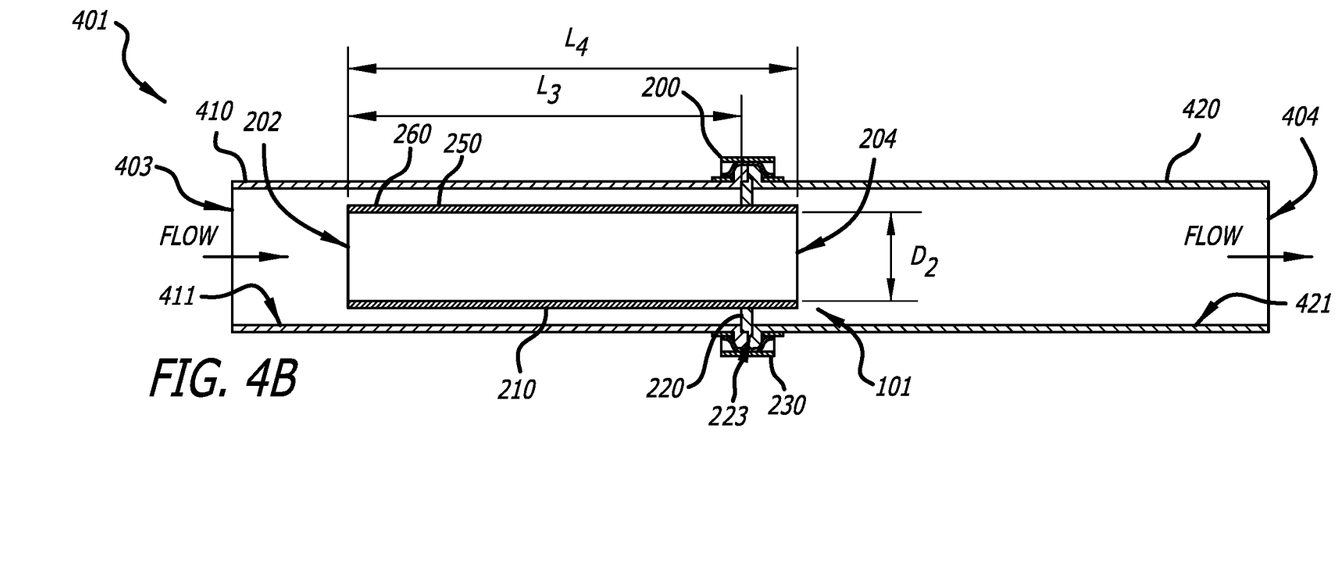
FIG. 4B provides a cross-sectional view illustration of a tunable exhaust system assembly with a tunable insert assembly for coupling an inlet tube to an outlet tube and for tuning one or more second parameters to produce one or more desired sound levels, in accordance with an embodiment of the present disclosure FIG. 4C provides a cross-sectional view illustration of a tunable exhaust system assembly with a tunable insert assembly for coupling an inlet tube to an outlet tube and for tuning one or more third parameters to produce one or more desired sound levels, in accordance with an embodiment of the present disclosure.
Figure 4C:
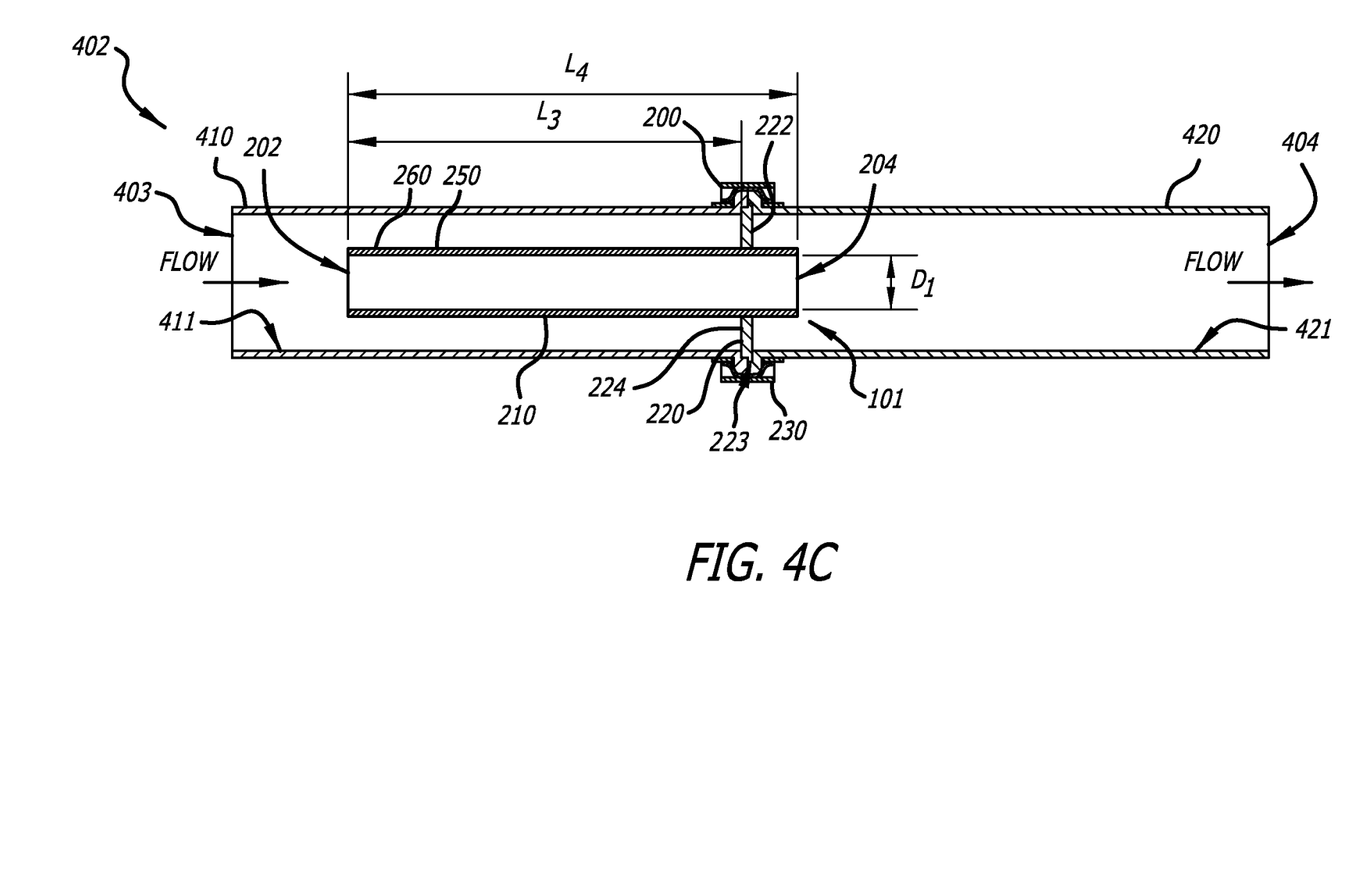

Referring now to FIGS. 4A-C, a series of cross-sectional view illustrations of tunable exhaust system assemblies 400-402 are shown, in accordance with embodiments of the disclosure. Mainly, in FIGS. 4A-C, the cross-sectional view illustrations of the assembly 200 depicted in FIG. 2 in conjunction with the tunable insert assemblies 101 depicted in FIGS. 1-2 and 3A are shown. Also shown with the tunable exhaust system assemblies 400-402 in FIGS. 4A-C are the intake tubes 410 (or inlet tubes) having inner surfaces 411, outer surfaces 430, and first open ends 403 (or intake/inlet open ends), and the exhaust tubes 420 (or outlet tubes) having inner surfaces 421, outer surfaces 440, and second open ends 404 (or outtake/outlet open ends).

Figure 5:
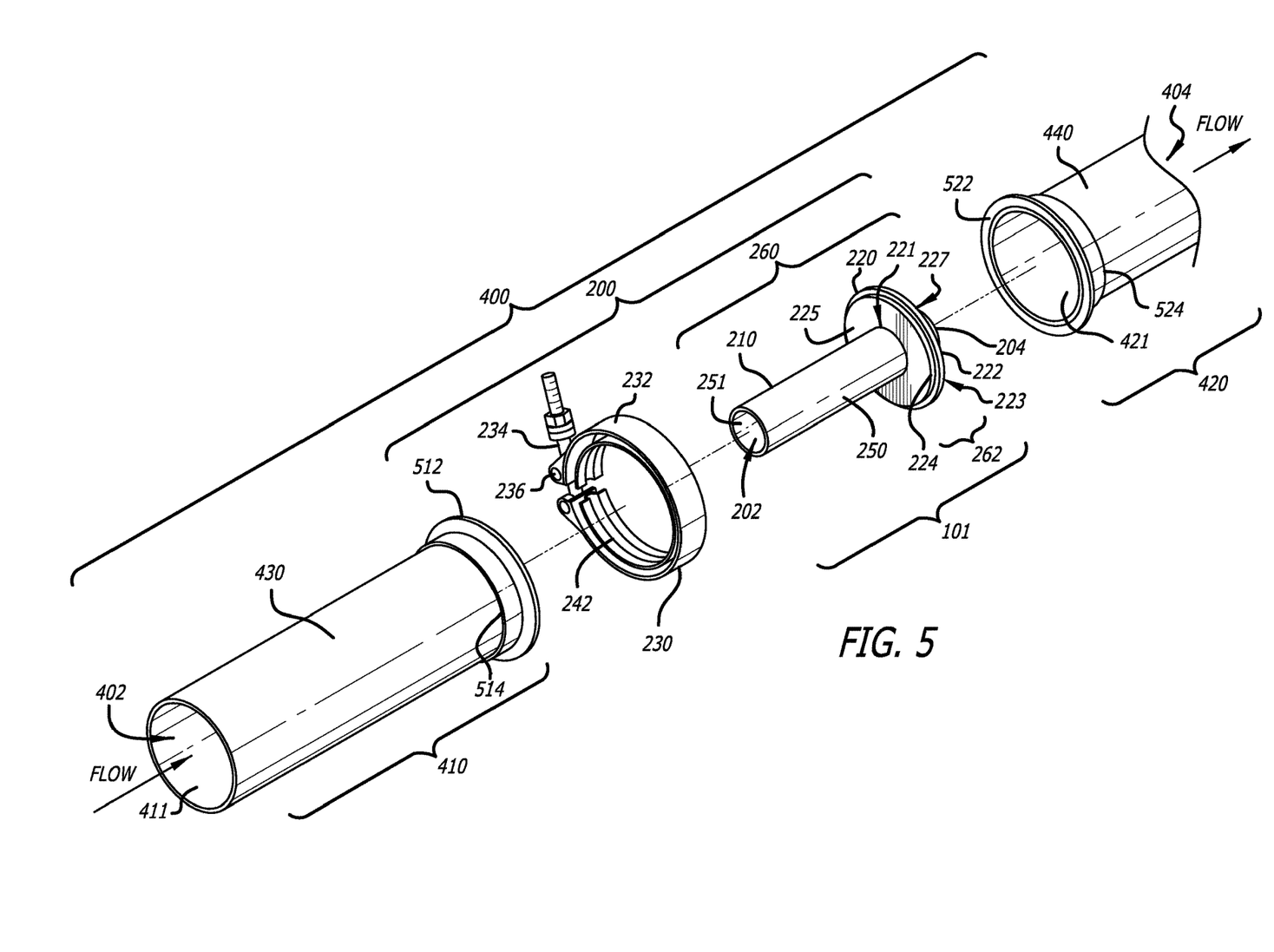
FIG. 5 provides an exploded view illustration of a tunable exhaust system assembly with an inlet tube, an outlet tube, a clamp, and a tunable insert assembly that has a tunable insert and an orifice plate, in accordance with an embodiment of the present disclosure.

For example, as shown in FIGS. 4A-C, the cross-sectional view illustrations of the tunable exhaust system assemblies 400-402 may plainly depict the clamp 230 (or a securing element) configured to securely affix the first open end 403 of the intake tube 410 to the second open end 404 of the exhaust tube 420, where the insert 210 may be configured to direct air flow from the first open end 403 of the intake tube 410 towards to the second open end 404 of the exhaust tube 420. Also, in FIGS. 4A-C, the register ring 223 and the respective peripheral portions of the orifice plate 220 are securely affixed between the intake tube 410 and the exhaust tube 420, where the secured/affixed intake and exhaust tubes 410 and 420 may entirely surround the outer surface 250 of the insert 210. Furthermore, as depicted with FIG. 4A in conjunction with FIG. 5 for example, the tunable exhaust system assembly 400 may clearly show a first flange 512 disposed at the open end 514 of the intake tube 410 and a second flange 522 disposed at the open end 524 of the exhaust tube 420, which the clamp 230 is thereby configured to securely affix the first flange 512 of the intake tube 410 to the second flange 522 of the exhaust tube 420. Based on this example and as shown in FIGS. 4A and 5, the tunable exhaust system assembly 400 may plainly depict as the register ring 223 is concentrically and entirely surrounded by the first flange 512 of the intake tube 410 and the second flange 522 of the exhaust tube 420.

Similar to the embodiments described above, it should be understood that both the assembly 200 and tunable insert assembly 101 depicted in FIGS. 4A-C may be substantially similar to the assembly 200 depicted in FIG. 2 and the tunable insert assemblies 101 depicted in FIGS. 1-2 and 3A, without limitations. For example, the tunable insert assemblies 101 depicted in FIGS. 4A-C may be similar to the tunable insert assembly 101 depicted in FIGS. 1-2 and 3A, with the exception that the insert 210 depicted in FIG. 4B has a second diameter "$D_2$," a second length "$L_4$" of the insert 210, and a second length "$L_3$" of the first portion 260 of the insert 210, and that the insert 210 depicted in FIG. 4C has the same diameter "$D_1$" as the insert 210 depicted in FIG. 4A, but has different lengths "$L_3$" and "$L_4$" than the lengths "$L_1$" and "$L_2$" of the insert 210 depicted in FIG. 4A.

That is, the illustrated embodiments depicted in FIGS. 4A-D may provide one or more predetermined diameters $D_{1-2}$ and predetermined lengths $L_{1-4}$, which may be configured for any tunable insert assemblies, tunable exhaust systems, and assemblies depicted and described herein, without limitations. As such, the tunable exhaust system assemblies 400-402 may configure any of the tunable insert assemblies 101 to produce a range of tunable sound pressure levels and/or a tunable sound frequency range based on these predetermined diameters $D_{1-2}$ and lengths $L_{1-4}$ depicted in FIGS. 4A-C. For example, the tunable exhaust system assemblies 400-402 may be configured to alter at least one or more of the first diameter $D_1$ and first length $L_2$ of the insert 210 as shown in FIG. 4A to at least one of the second diameter $D_2$ and second length $L_4$ of the insert 210 as shown in FIG. 4B, where the second diameter $D_2$ and/or second length $L_4$ of the insert 210 shown in FIG. 4B may thereby be configured to produce a second sound pressure level that is different (or greater/less than) a first sound pressure level produced by the first diameter $D_1$ and first length $L_2$ of the insert 210 shown in FIG. 4A. Likewise, in another example, the tunable exhaust system assemblies 400-403 may be configured to alter the length $L_1$ of the first portion 260 of the insert 210 as shown in FIG. 4A to at least the length $L_3$ of the first portion 260 the insert 210 as shown in FIG. 4B, where the length $L_3$ of the first portion 260 of the insert 210 shown in FIG. 4B may thereby be configured to produce a second sound frequency range that is different (or greater/less than) a first sound frequency range produced by the length $L_1$ of the first portion 260 of the insert 210 shown in FIG. 4A.

Although only two different diameters and four different lengths are shown in FIGS. 4A-C, it should be understood that any number tunable parameters, such as any number of different diameter, lengths, sizes, configurations, and such, may be configured by any of the tunable insert assemblies 101 and tunable exhaust system assemblies 400-402 depicted in FIGS. 4A-C, without limitation.

Referring to FIG. 5, an exploded view illustration of the tunable exhaust system assembly 400 depicted in FIG. 4A is shown, in accordance with some embodiments of the disclosure. It should be understood that the tunable exhaust system assembly 400 depicted in FIG. 5 may be substantially similar to the tunable exhaust system assembly 400 depicted in FIG. 4A. For example, the tunable exhaust system assembly 400 depicted in FIG. 5 may be similar to the tunable exhaust system assembly 400 depicted in FIG. 4A, with the exception that the intake and exhaust tubes 410 and 420 depicted in FIG. 5 are configured with the flanges 512 and 522 disposed at the respective open ends 514 and 524. Also, the tunable insert assembly 101 depicted in FIG. 5 may be substantially similar to the tunable insert assembly 101 depicted in FIG. 4A and any of the other FIGS. 1-2 and 3A.

Information as shown and described in detail herein is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

What is claimed is:

1. A tunable exhaust system for an internal combustion engine of a vehicle, comprising:
   a first tube having a first end and a second end;
   a second tube having a third end and a fourth end;
   a securing element configured to securely affix the second end of the first tube to the third end of the second tube; and
   a tunable insert assembly having an insert, an orifice plate, and a register ring, wherein:
      the insert has a first open end and a second open end;
      the orifice plate has a first end, a second end, and an opening, wherein:
         the orifice plate is clamped, where the clamping securely holds the orifice plate, thereby avoiding rattling;
         wherein the outer surface of the orifice plate extends along a peripheral outer circumference of the orifice plate, while an inner surface of the orifice plate extends along a circumference of the opening;
         wherein at least one register ring is disposed over an outer peripheral surface of the orifice plate;
      a plurality of perforated openings are disposed through the insert; and
      the tunable insert assembly is configured to:
      direct air from the first tube to the second tube;
      a first portion of the insert extends laterally from the first open end to a perpendicular intersection of the first end of the orifice plate; and
      produce a range of tunable sound pressure levels based on one or more predetermined diameters and lengths.

2. The tunable exhaust system of claim 1, wherein:
   the insert is perpendicularly disposed through the opening;
   the register ring and orifice plate are affixed between the second and third ends of the first and second tubes;
   the insert comprises predetermined diameters and lengths;
   the insert comprises an inner surface and an outer surface; and
   the insert is configured to receive the air from the first tube at the first open end and direct the air towards the second tube at the second open end.

3. The tunable exhaust system of claim 2, wherein:
   the affixed first and second tubes entirely surround the outer surface of the insert,
   the register ring comprises a concentric register ring;
   the concentric register ring is configured to facilitate a simplified installation of the tunable insert assembly with the securing element and first and second tubes;
   the inner surface of the opening of the orifice plate is disposed over a portion of the outer surface of the insert;
   the orifice plate comprises a disk-shaped orifice plate;
   the opening is concentrically shaped in the disk-shaped orifice plate; and
   the outer surface of the disk-shaped orifice plate is concentrically aligned with the inner surface of the disk-shaped orifice plate.

4. The tunable exhaust system of claim 3, wherein:
   the insert comprises a first portion and a second portion;
   the second portion of the insert extends laterally from the second open end to an outer surface of the second end of the orifice plate.

5. The tunable exhaust system of claim 4, wherein:
   the one or more predetermined diameters and lengths comprise at least one or more of a first diameter, a second diameter, a first length, and a second length;
   the first length of the insert extends laterally from the first open end to the second open end; and
   both the first diameter and length of the insert of the tunable insert assembly are configured to produce a first sound pressure level from the range of tunable sound pressure levels.

6. The tunable exhaust system of claim 5, wherein:
   the tunable insert assembly is configured to alter at least one or more of the first diameter and first length of the insert to at least one of a second diameter and a second length of a second insert;
   the at least one or more of the second diameter and length of the second insert of the tunable insert assembly are configured to produce a second sound pressure level from the range of tunable sound pressure levels; and
   the second sound pressure level is greater or less than the first sound pressure level.

7. The tunable exhaust system of claim 6, wherein:
   the first portion of the insert comprises a third length;
   the third length of the first portion of the insert extends laterally from the first open end to the outer surface of the first end of the orifice plate; and the third length of the first portion of the insert of the tunable insert assembly is configured to produce a first sound frequency range.

8. The tunable exhaust system of claim 7, wherein:
the second insert comprises a first portion, a second portion, a first open end on the first portion, and a second open end on the second portion;
the first portion of the second insert comprises a fourth length;
the fourth length of the first portion of the second insert extends laterally from the first open end to the outer surface of the first end of the orifice plate; and
the fourth length of the first portion of the second insert of the tunable insert assembly is configured to produce a second sound frequency range.

9. The tunable exhaust system of claim 8, wherein the second sound frequency range is greater or less than the first sound frequency range.

10. The tunable exhaust system of claim 1, wherein:
the insert comprises a baffle shaped insert;
the first tube comprises an intake tube; and
the second tube comprises an exhaust tube.

11. The tunable exhaust system of claim 10, wherein the baffle shaped insert comprises at least one of a solid tube, a flared tube, and a crimped tube.

12. The tunable exhaust system of claim 2, wherein:
wherein the second end of the first tube comprises a first flange; and
wherein the third end of the second tube comprises a second flange.

13. The tunable exhaust system of claim 12, wherein the concentric register ring is entirely surrounded by the first flange of the first tube and the second flange of the second tube.

14. The tunable exhaust system of claim 1, wherein:
the securing element comprises a V-band shaped clamp; and
the V-band shaped clamp is configured to securely affix the first flange of the first tube to the second flange of the second tube.

15. The tunable exhaust system of claim 13, wherein:
the securing element comprises a flanged interface having nuts and bolts; and
the nuts and bolts of the flanged interface are configured to securely affix the first flange of the first tube to the second flange of the second tube.

16. A tunable insert assembly for a tunable exhaust system, comprising:
a baffle insert having a first open end and a second open end, wherein the baffle insert comprises one or more predetermined diameters and lengths, and wherein a plurality of perforated openings are disposed through the baffle insert;
an orifice plate having a first end, a second end, and an opening, wherein the baffle insert is perpendicularly disposed through the opening; and
wherein the orifice plate is clamped, where the clamping securely holds the orifice plate, thereby avoiding rattling;
wherein the outer surface of the orifice plate extends along a peripheral outer circumference of the orifice plate, while an inner surface of the orifice plate extends along a circumference of the opening;
a concentric register ring having a band-shaped solid body circumferentially disposed over an outer peripheral surface of the orifice plate;
a first portion of the insert extends laterally from the first open end to a perpendicular intersection of the first end of the orifice plate; and
wherein the baffle insert is configured to:
direct air from the first open end to the second open end; and
produce a range of tunable sound pressure levels and a tunable sound frequency range based on one or more predetermined diameters and lengths.

17. The tunable insert assembly of claim 16, wherein:
the baffle insert comprises an inner surface and an outer surface;
the baffle insert comprises a first portion and a second portion, wherein a plurality of perforated openings disposed through the baffle insert;
the first portion comprises one or more predetermined first diameters and lengths from the one or more predetermined diameters and lengths;
the inner surface of the opening is disposed over a portion of the outer surface of the baffle insert;
the second portion of the insert extends laterally from the second open end to an outer surface of the second end of the orifice plate;
the orifice plate comprises a disk-shaped orifice plate, wherein the outer surface of the orifice plate extends along a peripheral outer circumference of the orifice plate, while an inner surface of the orifice plate extends along a circumference of the opening;
the opening comprises a concentric opening in the disk-shaped orifice plate;
the outer surface of the disk-shaped orifice plate is concentrically aligned with the inner surface of the disk-shaped orifice plate;
the baffle insert is configured to direct air from an intake tube of the tunable exhaust system towards an exhaust tube of the tunable exhaust system;
the intake tube comprises a first end and a second end; and
the exhaust tube comprises a third end and a fourth end.

18. The tunable insert assembly of claim 17,
the concentric register ring protrudes and extends outwards from the peripheral outer surface of the orifice plate;
the orifice plate and the baffle insert are disposed in or extend through the inner diameter of the concentric register ring;
the concentric register ring and a peripheral portion of the orifice plate are securely affixed between the second end of the first tube and the third end of the second tube using a V-band clamp;
the V-band clamp is configured to securely affix the second end of the first tube to the third end of the second tube;
the affixed first and second tubes entirely surround the outer surface of the baffle insert;
the concentric register ring is configured to facilitate a simplified installation of the tunable insert assembly with the V-band clamp and intake and exhaust tubes;
second end of the intake tube comprises a first flange;
the third end of the exhaust tube comprises a second flange;
the concentric register ring is entirely surrounded by the first second flanges of the intake and exhaust tubes;
the one or more predetermined diameters and lengths comprise at least one or more of a first diameter, a second diameter, a first length, and a second length; and both the first diameter and length of the baffle insert are configured to produce a first sound pressure level from the range of tunable sound pressure levels.

19. The tunable insert assembly of claim 18, wherein:

the tunable insert assembly is configured to alter at least one or more of the first diameter and first length of the baffle insert to at least one of a second diameter and a second length of a second baffle insert;

the at least one or more of the second diameter and length of the second baffle insert are configured to produce a second sound pressure level from the range of tunable sound pressure levels;

the second sound pressure level is greater or less than the first sound pressure level;

the one or more predetermined first diameters and lengths comprise at least one or more of a third length and a fourth length;

the first portion of the baffle insert comprises the third length;

the third length of the first portion of the baffle insert extends laterally from the first open end to the outer surface of the first end of the orifice plate;

the third length of the first portion of the baffle insert is configured to produce a first sound frequency range from the tunable sound frequency range;

the second baffle insert comprises a first portion, a second portion, a first open end on the first portion, and a second open end on the second portion;

the first portion of the second baffle insert comprises the fourth length;

the fourth length of the first portion of the second baffle insert extends laterally from the first open end to the outer surface of the first end of the orifice plate;

the fourth length of the first portion of the second baffle insert is configured to produce a second sound frequency range from the tunable sound frequency range; and the second sound frequency range is greater or less than the first sound frequency range.

20. A tunable exhaust system, comprising:

an intake tube having a first end and a second end with a first flange;

an exhaust tube having a third end and a fourth end with a second flange;

a V-band clamp configured to securely affix the first flange of the intake tube to the second flange of the exhaust tube; and a tunable insert assembly having a baffle insert, an orifice plate, and a concentric register ring, wherein:

the tunable baffle insert has a first open end and a second open end, and a plurality of perforated openings disposed through the baffle insert;

wherein an outer surface of an orifice plate extends along a peripheral outer circumference of the orifice plate, while an inner surface of the orifice plate extends along a circumference of the opening;

a first portion of the insert extends laterally from the first open end to a perpendicular intersection of the first end of the orifice plate; and wherein the tunable insert assembly is configured to:

direct air from the intake tube to the exhaust tube; and produce a range of tunable sound pressure levels based on one or more predetermined diameters and lengths.

* * * * *